Patented Jan. 13, 1925.

1,523,044

UNITED STATES PATENT OFFICE.

ISAAC VAN DEN BROEK, OF BOSTON, AND FREDERICK S. NESBIT, OF ROSLINDALE, BOSTON, MASSACHUSETTS.

PROCESS OF REDUCING ORES AND OBTAINING METAL PRODUCTS THEREFROM.

No Drawing. Application filed June 15, 1923. Serial No. 645,702.

*To all whom it may concern:*

Be it known that we, ISAAC VAN DEN BROEK, a subject of the Queen of the Netherlands, residing at Boston, in the county of Suffolk and State of Massachusetts, and FREDERICK S. NISBET, a citizen of the United States, residing at Roslindale, Boston, in the county of Suffolk and State of Massachusetts, have invented a certain new and useful Improvement in Processes of Reducing Ores and Obtaining Metal Products Therefrom, of which the following is a full, clear, and exact description.

This invention relates to a process for reducing ores and obtaining metal products therefrom and, as disclosed herein, is specially adapted for the reduction of iron ore and the production of refined iron, steel and alloys therefrom, in the manner usually employed in open-hearth furnaces.

One of the objects of our invention is to enable such ores to be reduced and the metal products to be obtained therefrom more quickly and economically than is possible by the use of the ordinary blast furnace. A further object of the invention is to enable the ores (and particularly iron ore) to be reduced and the resultant metal refined and treated directly in and by a continuous operation of a furnace or furnaces of the reverberatory, or open-hearth type.

In practicing our process, and with special reference to the manufacture of iron and its above products, we first sinter an intimate mixture of iron ore, carbon (preferably in the cheap commercial form of a coal) and a fluxing agent (preferably in the form of limestone). The ingredients are mixed in about the following proportions by weight:—

Iron ore 61 parts, through ½" mesh; coal (bituminous) 27 parts, through 1/16" mesh; flux (limestone) 12 parts, through 40 mesh.

The ingredients thus prepared are mixed thoroughly with one another and, if preferred, with water constituting from 3% to 6% of their combined weight. When thus mingled and treated, the resultant mass is dried, or allowed to dry.

The mixture is then heated in a retort or retorts such as are employed for the manufacture of coke, at a temperature of from about 2200° to 2400° F., until a sintered structure is produced in which a considerable proportion of the ore is reduced to the metallic form and to lower oxides, and the limestone is largely calcined into lime. Where bituminous or semi-bituminous coal is employed as the carbon ingredient, some coke is produced and a large quantity of gas will be evolved in connection with the retorting operation, which gas may be used in the reverberatory or open-hearth furnace.

A coherent sintered mass of carbon, fluxing agent, metal and lower oxides results from the retorting operation, which mass is then used as a charge for one or more reverberatory, or open-hearth, furnaces, where it is heated in a reducing atmosphere by the gaseous fuel employed therein. This results in melting the previously reduced iron and in completely reducing the ore to molten metallic iron, removing the surplus slag from time to time. The molten metal may then be refined or otherwise modified in the same furnace or furnaces, in accordance with ordinary open-hearth furnace practice; or it may be drawn off at any stage of the operation and transferred to another furnace for special treatment, using the former furnace merely as a reducing and melting furnace.

Among the advantages of our invention are the following:

A. Reduction of ore without the necessity of a blast furnace installation.

B. Great saving of time in recovering the final product over the use of blast furnaces for the reducing operation.

C. Ability to use cheap non-coking coal, as a coke-structure is unnecessary in the retorted mixture.

D. The lower oxides produced by the partial reduction of the ore during the sintering, or retorting, operation, are readily reducible in the open-hearth furnace and are not liable to enter the slag; any minute metallic bits of iron that may be present in the sintered mass will be readily melted in the furnace. This results in shortening the "heat" in open-hearth furnace or furnaces, with a saving of fuel, and saving the loss of iron that would otherwise pass off into the slag.

Having thus described our invention, what we claim is:—

1. The process of treating ore which comprises forming a sintered mass by heating a mixture of ore, fluxing agent and carbonaceous material, and reducing the said mass in a furnace of the reverberatory type.

2. The process of treating ore which comprises retorting a mixture of iron ore, fluxing agent and coal, thereby to produce a coherent mass, and reducing the said mass in a furnace of the reverberatory type.

3. The process of treating ore which comprises partially reducing an ore with carbonaceous material and a fluxing agent, and completing such reduction in a furnace of the reverberatory type.

4. The process of treating ore which comprises retorting a mixture of iron ore, fluxing agent and coal, to produce a sintered coherent mass containing carbon and completely and partially reduced ore, and completing the reduction of such ore to metal and refining such metal in a single furnace.

5. The process of treating ore which comprises making a moistened mixture of the same with carbonaceous material and a fluxing agent, drying and retorting the mixture thus produced, thereby to produce a sintered product, and reducing the ore in the said product in a furnace of the reverberatory type.

6. The process of treating ore which comprises making an intimate moistened mixture of the same with coal and limestone, drying and retorting the mixture thus produced, thereby to produce a sintered coherent mass containing carbon, and completing the reduction of the ore in the said product in a furnace of the reverberatory type.

7. The process of treating ore which comprises making an intimate mixture of the same with coal and limestone, retorting the mixture thus produced, thereby to produce a sintered coherent mass containing carbon, and completing the reduction of the ore in the said product and refining the resultant metal in a furnace of the reverberatory type, and refining the resultant metal.

8. The process of treating ore which comprises forming a mixture of the following ingredients in substantially the following proportions: Iron ore 61 parts, through $\frac{1}{2}''$ mesh; bituminous or semi-bituminous coal 27 parts, through $\frac{1}{16}''$ mesh; limestone 12 parts, through forty mesh, retorting the mixture thereby to produce a sintered mass, and completing the reduction of the ore and refining the resultant metal in a furnace of the reverberatory type.

9. The process of treating ore which comprises forming a moistened mixture of the following ingredients in substantially the following proportions: Iron ore 61 parts, through $\frac{1}{2}''$ mesh; bituminous or semi-bituminous coal 27 parts, through $\frac{1}{16}''$ mesh; limestone 12 parts, through 40 mesh; water 3 to 6 parts, drying and retorting the mixture thereby to produce a sintered mass, and completing the reduction of the ore to the desired point and refining the resultant metal in a furnace of the reverberatory type.

10. The process of treating ore which comprises forming a mixture of the following ingredients in substantially the following proportions: Iron ore 61 parts, through $\frac{1}{2}''$ mesh; bituminous or semi-bituminous coal 27 parts, through $\frac{1}{16}''$ mesh; limestone 12 parts, 40 mesh, retorting the mixture thereby to produce a sintered mass, and completing the reduction of the ore in a furnace of the reverberatory type.

11. The process of treating ore which comprises forming a moistened mixture of the following ingredients in substantially the following proportions: Iron ore 61 parts, through $\frac{1}{2}''$ mesh; bituminous or semi-bituminous coal 27 parts, through $\frac{1}{16}''$ mesh; limestone 12 parts, through 40 mesh, retorting the mixture thereby to produce a sintered mass, completing the reduction of the ore in a furnace of the reverberatory type, and refining the resultant metal.

In testimony whereof, we hereunto affix our signatures.

ISAAC VAN DEN BROEK.
FREDERICK S. NISBET.